United States Patent [19]

Gillman

[11] Patent Number: 5,198,609
[45] Date of Patent: Mar. 30, 1993

[54] AUXILIARY TARGET AREA CHAFF CONTAINER

[75] Inventor: Charles B. Gillman, Hanford, Calif.

[73] Assignee: The United States of America as represented by the Secretary of the Navy, Washington, D.C.

[21] Appl. No.: 874,155

[22] Filed: Apr. 27, 1992

[51] Int. Cl.5 .............................................. B64D 1/02
[52] U.S. Cl. .................................. 89/1.51; 102/357; 102/505; 244/137.4
[58] Field of Search .................. 89/1.54, 1.51, 1.11; 102/505; 244/136, 137.4; 221/185

[56] References Cited

U.S. PATENT DOCUMENTS

| | | | |
|---|---|---|---|
| 3,064,575 | 11/1962 | Schermuly | 102/357 |
| 3,430,533 | 3/1969 | Kifor et al. | 244/136 |
| 3,797,394 | 3/1974 | Thurston et al. | 102/357 |
| 3,901,467 | 8/1975 | Hawkshaw | 244/136 |
| 4,130,059 | 12/1978 | Block et al. | 102/505 |
| 4,397,433 | 8/1983 | Guitout et al. | 102/1.51 |
| 4,404,912 | 9/1983 | Sindermann | 102/505 |
| 4,601,445 | 7/1986 | Duclos et al. | 244/137.4 |
| 4,682,529 | 7/1987 | Duclos et al. | 89/1.51 |
| 4,683,824 | 8/1987 | Gibbs | 102/505 |

Primary Examiner—David H. Brown
Attorney, Agent, or Firm—Ron Billi; Melvin J. Sliwka

[57] ABSTRACT

An auxiliary target area chaff container for dispensing chaff and other radar counter measure materials from an aircraft includes a housing, chaff canister located in said housing; trigger wires for dispensing the chaff means for retaining said chaff canisters in said housing and means for attaching said housing to an aircraft. The chaff canisters are automatically dispensed when a bomb is released.

12 Claims, 3 Drawing Sheets

AUXILIARY TARGET AREA CHAFF CONTAINER

BACKGROUND

This invention relates to "chaff" payload dispensing apparatus. More specifically, but without limitation, the present invention relates to an apparatus for automatically dispensing a chaff payload and/or other radar counter-measure materials from an aircraft to confuse an observer at a radar receiving apparatus thereby eliminating the possibility of the chaff dispensing aircraft and the following aircraft being separately silhouetted on a receiving radar screen.

The term "chaff" used herein generally refers to radar interfering means such as the usual type of foil ribbons as well as similar means, for example, metal covered glass fibers and the like. Devices of this type in question are known and used for spreading chaff clouds from airplanes directly and by other means. Such a chaff cloud normally consists of a very great number of ribbons or fibers of different lengths which form dipoles of different lengths. Depending on the length of the dipoles, the chaff clouds will interfere at frequency bands used for radar reconnaissance, homing missiles and similar objects. Chaff clouds are also employed for the purpose of tracking high altitude wind currents. In addition, other radar counter-measures may be dispensed utilizing the present invention.

In the past, chaff has been dispensed using a variety of apparatus. One such device utilizes a chaff carrying rocket with a mechanical timer which triggers an electronic activator at a predetermined interval after launch. The activator explodes and releases a locking mechanism which separates the rocket and disperses the chaff. Such a device is shown in U.S. Pat. No. 3,143,965. Another such device utilizes a chaff carrying rocket with a burning fuse of predetermined burn time to explode the rocket and dispense the chaff. Such a device is shown in U.S. Pat. No. 3,137,231. A passive device shown in U.S. Pat. No. 3,500,409 utilizes a chaff container with a removable lid having a drag lip for catching the wind and separating the lid from the container. As the lid separates from the container, a rope is withdrawn to dispense the chaff in the container. Still another device includes a chaff carrying outer case with a timer for delaying the deployment of a parachute after release. The parachute pulls a canister from the outer case wherein an explosive charge is activated to explode the canister and release the chaff. An example of such a device is shown in U.S. Pat. No. 3,242,810. Other devices are shown in U.S. Pat. No. 3,068,472 and U.S. Pat. No. 4,134,115.

Modern attack aircraft are most vulnerable to enemy defenses during a conventional bomb attack run when the pilot must maintain the aircraft in a straight path delivery. In addition, the pilot is so preoccupied with the many complexities of delivering and directing the bomb payload to the target that manipulating controls to dispense "chaff" clouds is very difficult. Additionally, existing pilot activated chaff dispensers carry a limited amount of chaff which oftentimes is already depleted prior to reaching the target area. Accordingly, it is highly desirable to be able to automatically release additional "chaff" during the bombing run without the need for pilot intervention. In addition, the "chaff" payload dispensing apparatus must be sufficiently simplistic, to enable ground crew personnel to "load in" different arrays of chaff and other radar counter-measures. It is therefore essential that the apparatus be highly simplistic and easily manipulated by ground crew personnel.

SUMMARY OF THE INVENTION

Accordingly, the preferred embodiment of the present invention includes a box shaped housing with an open bottom a plurality of cylindrical chaff canisters arranged and suspended by a rod therein with the discharge end of each canister positioned proximate the open bottom of the housing. Each chaff canister contains a trigger wire which is automatically pulled by a released bomb to dislodge the chaff retained therein. The housing is slidably located on a bail retention rod located within the pylon of an aircraft. Each bomb releases 5 chaff canisters.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 3 is a top view of the present invention attached to the bail retention rod and showing the chaff canisters with suspension rod running there through.

DETAILED DESCRIPTION OF PREFERRED EMBODIMENT

Figure 1:
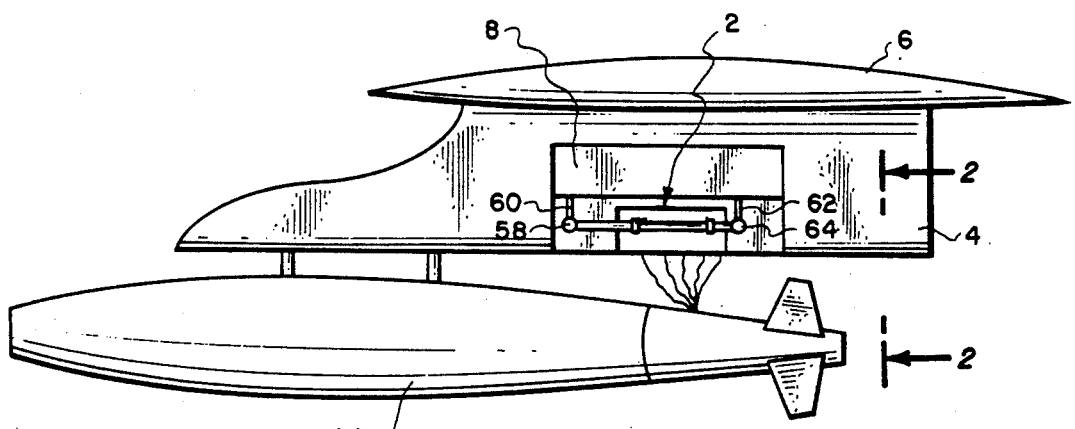
FIG. 1 is an illustration of the present invention installed in the pylon of a aircraft with trigger wires attached to a bomb.

The preferred embodiment of the present invention is illustrated by way of example in FIGS. 1 to 8. As shown in FIG. 1, Auxiliary Target Area Chaff Container (ATACC) 2 is shown installed in pylon 4 below wing 6. It should be noted that ATACC 2 is visible in FIG. 1 since access door 8 is in the open position. However, when ready for flight, ATACC 2 is housed between closed access door 8 and panel 10, as shown from the rear in FIG. 2, with trigger wires 16 protruding therefrom. ATACC 2 includes housing 12, a plurality of chaff canisters 14, a plurality of trigger wires 16, mounting brackets 18 and chaff canister suspension rod 20 (see FIGS. 2 and 3).

Figure 3:
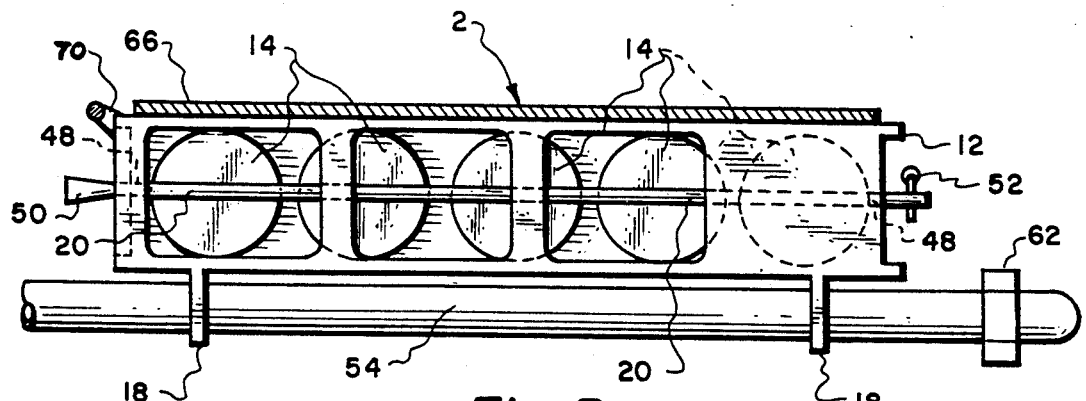
Figure 4:
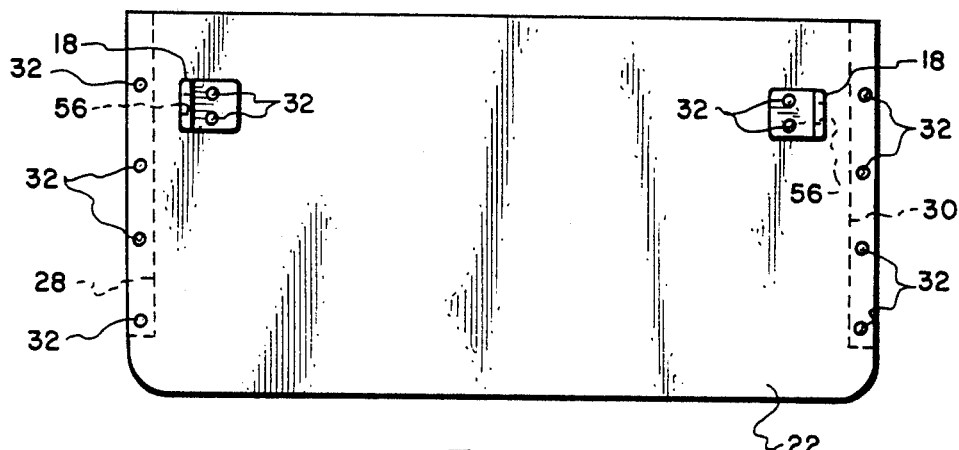
FIG. 4 is a side view of the chaff canister housing.
Figure 5:
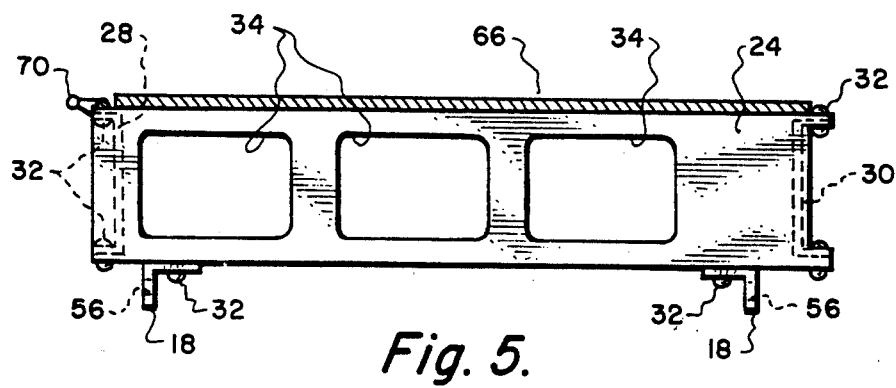
FIG. 5 is a top view of the chaff canister housing.
Figure 6:
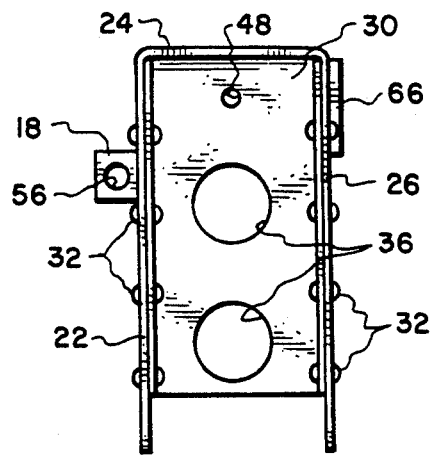
FIG. 6 is a rear end view of the chaff canister housing.

Housing 12 is of the form of a rectangle box with an open bottom and includes first side 22, top 24, second side 26, front end plate 28 and rear end plate 30 as shown in FIGS. 3, 4, and 5. As can be seen in FIG. 6, first side 22, top 24 and second side 26 are formed from a single piece, bent in a "U" shape, with front end plate 28 and rear end plate 30 located therebetween and attached, for example, by rivets 32. Each front and rear end plate 28 and 30 is "U" shaped, when viewed from the top as in FIG. 5. Top 24 includes access holes 34 for assisting the loading of chaff cartridges and for providing clearance between housing 12 and obstruction that may be present in pylon 4. It will be understood that holes 34 may vary in shape and location depending on application, without departing from the spirit of the invention, since different generations of the same aircraft may contain variations in hardware which may intrude upon the space to be occupied by housing 12. For example, some versions of the F/A-18 aircraft contain bolts which require holes 34 to prevent contact between top 24 and the bolts. In other versions, the bolts are flush and do not contact top 24 (or other parts of housing 12) even if holes 24 are not present. In such a case, holes 34 are provided only for assisting the loading of chaff canisters 14. Front end plate 28 and rear end plate 30 each contain two inspection/access holes 36.

Figure 7:
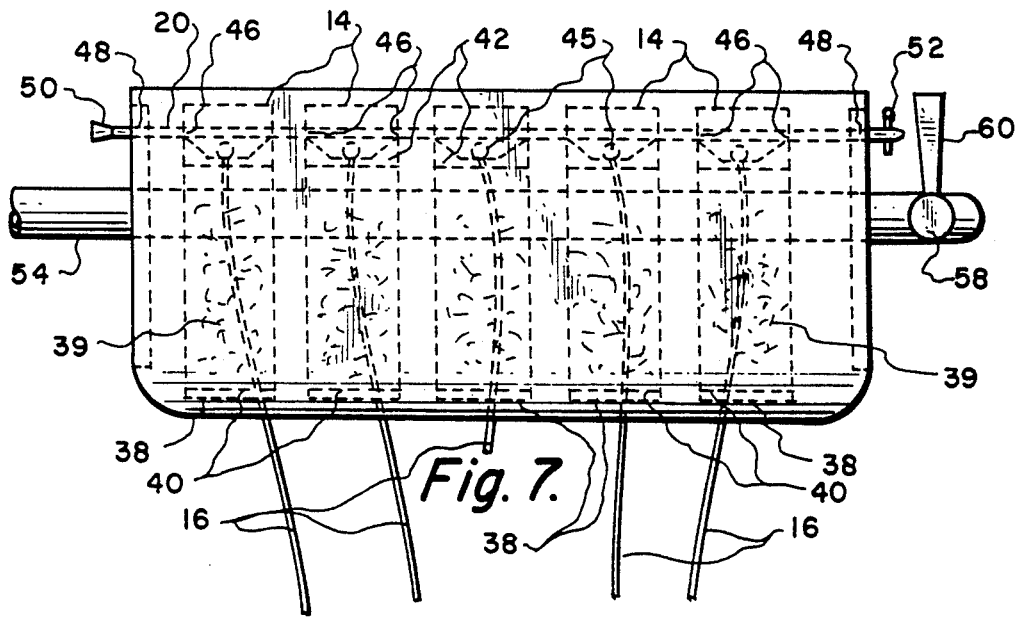
FIG. 7 is a side view of the chaff canister housing showing the chaff canister, trigger wires, end caps and suspension rod in phantom.

A plurality of chaff canisters 14 are abuttably located within housing 12 and positioned and arranged so that the discharge end 38 of each canister 14 is adjacent the open end (ie. bottom) of housing 12 as shown in FIG. 7. Each canister 14 is cylindrical in shape with a hollow center wherein chaff material 39 is located. The chaff is retained in hollow canister 14 by end caps 40 and 42 which, although secure, may be slidably dislodged from canister 14 by the application of a force on either or both caps in a direction parallel to the axis of canister 14. As a result, the caps, as well as the retained chaff, may be dislodged from canister 14. In the preferred embodiment, caps 40 and 42 are dislodged from canister 14 by applying a force to trigger wires 16 in the downward direction. This force is applied when bomb 44 is released from the aircraft.

Figure 2:
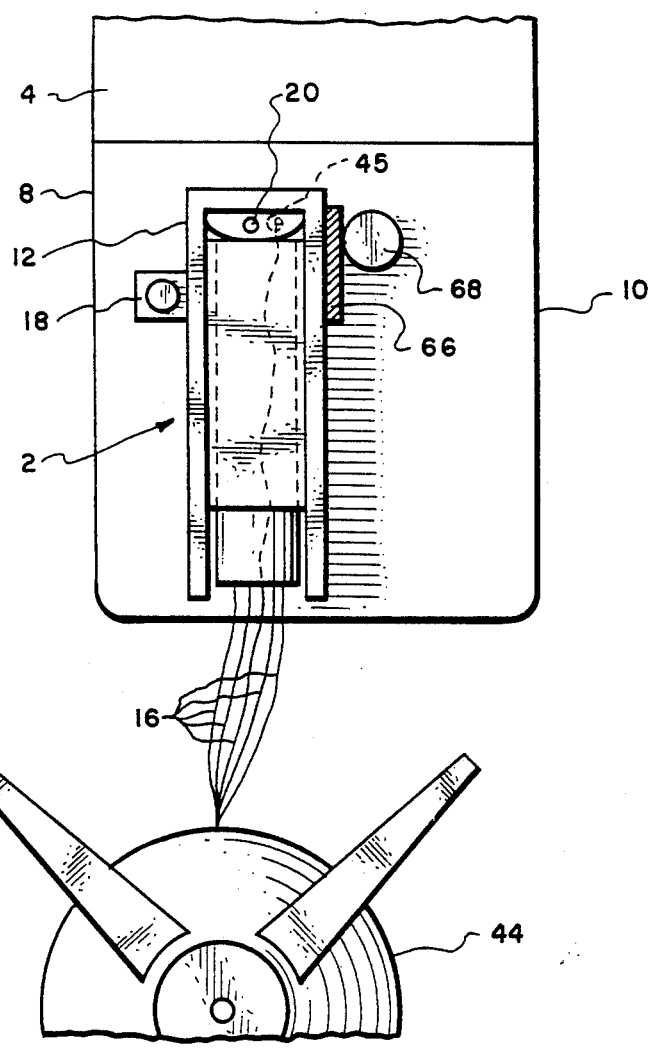
FIG. 2 is a rear end view taken through section 2—2 of FIG. 1 showing the present invention installed between the access door and side of a pylon and showing the trigger wires attached to a bomb.

As can be seen in FIGS. 1 and 2, trigger wires 16 are attached to bomb 44. When bomb 44 is released, the falling bomb pulls trigger wires 16 downward to automatically release the chaff retained in canisters 14. Each trigger wire 16 must be fitted through a small hole in cap 40, then threaded through the chaff in canister 14 and then threaded back out canister 14 through cap 42 and attached to disc 45. Disc 45 functions as a knot and distributes the force of pulled trigger wire 16 over a portion of cap 42. Accordingly, when trigger wire 16 is pulled downward, cap 42 forces chaff material 39 and cap 40 out the discharge end 38 of canister 14.

Each chaff canister 14 is suspended in housing 12 by suspension rod 20 which is slidably fitted through bores 46 located in the top of each canister 14. Suspension rod 2 is slidably fitted through bores 48 located in both ends plates 28 and 30 of housing 12. Rod 20 is retained on one end by enlargement 50 and on the other end by cotter pin 52. One end of bail retention rod 54 pivots in the vertical direction around pin 58 and also pivots in the horizontal direction around bracket 60 which is attached to pylon 4. The other end of bail retention rod is removably attached to bracket 62 via pin 64. To install ATACC 2 in an aircraft, bail retention rod 54 is disengaged from bracket 62 by removing pin 64 and then pivoted downward and to the side. Housing 12 is attached and positioned on bail retention rod 54 by slidably engaging brackets 18 over bail retention rod 54 via bores 56. After appropriately positioning housing 12, on bail retention 54, bail retention rod 54 is pivoted back into engagement with bracket 60 and secured by pin 64. Trigger wires 16 are then attached to bomb 44 by wrapping around any suitable connection point on bomb 44.

Figure 8:
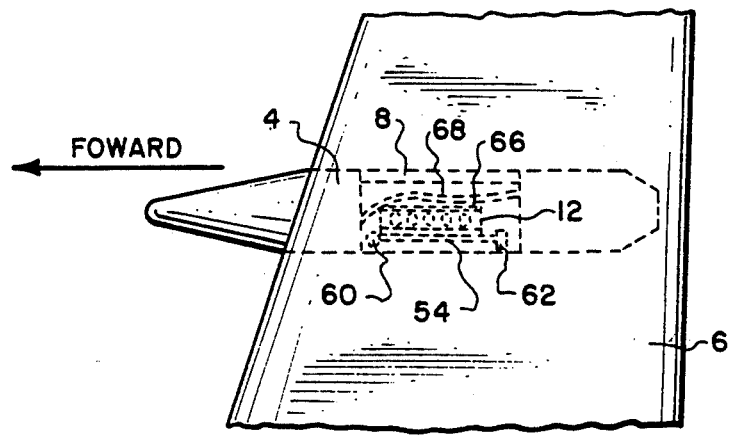
FIG. 8 is a top view of the present invention in phantom, showing the relationship of the present invention to various components of the aircraft.

Foam padding 66 is attached to second side 26 to both reduce the pivoting of housing 12 about bail retention rod 54 and to provide a cushion between second side 26 and fuel vent line 68 which is located in immediate proximity to second side 26, as best shown in FIGS. 2 and 8. Rubber cushion 70 is attached to housing 12 to provide additional protection against housing 12 sliding forward and contacting fuel vent line 68.

In the preferred embodiment, housing 12 is 1½ inches wide the outside surface of sides 22 and 26, 8¾ inches long, 6 inches high on first and second sides, 26 and 28, 5¼ inches high on front and rear end plates 28 and 30. A suitable material and preferred material for housing 12 is 6061T-6 Aluminum, 0.024 inches thick. The inside dimensions of housing 14 are 1½ inches long, and 5¼ inches high. Bores 56 in mounting brackets 18 are ¼ inch in diameter with the centerline of the bore located 1¼ inches below the top 24 of housing 12. Suspension rod 20 is ¼ inch in diameter with the centerline of rod 20 located ⅜ inches below top 24 of housing 12. Each chaff canister 14 is approximately 1¼ inches in outside diameter and approximately 5¼ inches long. Foam padding 66 is approximately ¼ inch thick and approximately 2 inches wide. Trigger wires 16 are 0.032 inch safety wire.

Obviously many modifications and variations of the present invention are possible in light of the above teaching. It is therefore to be understood that within the scope of the appended claims, the invention may be practiced otherwise than as specifically described.

What is claimed is:

1. An auxiliary target area chaff container system for mounting in the pylon of an F/A 18 aircraft and for automatically dispensing chaff when a bomb is released comprising:
   a) a box shaped housing having an open bottom;
   b) at least one chaff canister means located in the housing, each chaff canister means having a discharge end and a non-discharge end, the discharge end located proximate the open bottom of said housing;
   c) a trigger wire for each said chaff canister means, each trigger wire having a first and second end, the first end of each trigger wire attached to one said chaff canister means and the second end of each trigger wire attached to a bomb located proximate said housing;
   d) means for attaching said housing in the pylon of the aircraft;
   e) means for retaining said chaff canister means in said housing;
   f) means for preventing the side of said housing from contacting a fuel vent line located in said pylon proximate said housing;
   g) means for preventing a corner of said housing from contacting the fuel vent line located in said pylon proximate said housing.

2. The apparatus defined in claim 1, wherein said housing includes access holes located in the top of said housing for facilitating the loading of said chaff canister means into said housing and for providing clearance for obstruction that are present in said aircraft.

3. The apparatus defined in claim 2, wherein the attaching means includes mounting brackets having bores therein, the mounting brackets attached to said housing and slidably communicating with a bail retention rod located in the pylon of said aircraft.

4. The apparatus defined in claim 3, wherein said chaff canister retaining means includes a suspension rod slidably communicating with the ends of said housing and with the non-discharge end of said chaff canister means.

5. The apparatus defined in claim 4, wherein the means for preventing the side of said housing from contacting said fuel vent line is foam padding.

6. The apparatus defined in claim 5, wherein the means for preventing the corner of said housing from contacting said fuel vent line is a rubber cushion.

7. An auxiliary target area chaff container for mounting in the pylon of an F/A 18 aircraft and for automatically dispensing chaff when a bomb is released comprising:
   a) a box shaped housing having an open bottom wherein at least one chaff canister means is located;
   b) a trigger wire for each chaff canister means, each trigger wire having a first and second end, the first end of each trigger wire attached to one said chaff canister means and the second end of each trigger wire attached to a bomb located proximate said housing;
   c) means for attaching said housing in the pylon of said aircraft;
   d) means for retaining at least one said chaff canister means in said housing;
   e) means for preventing the side of said housing from contacting a fuel vent line located in said pylon proximate said housing;
   f) means for preventing a corner of said housing from contacting the fuel vent line located in said pylon proximate said housing.

8. The apparatus defined in claim 7, wherein said housing includes access holes located in the top of said housing for facilitating the loading of said chaff canister means into said housing and for providing clearance for obstruction that are present in said aircraft.

9. The apparatus defined in claim 8, wherein the attaching means includes mounting brackets having bores therein, the mounting brackets attached to said housing and slidably communicating with a bail retention rod located in the pylon of said aircraft.

10. The apparatus defined in claim 9, wherein the chaff canister retaining means includes a suspension rod slidably communicating with the ends of said housing and with the non-discharge end of said chaff canister means.

11. The apparatus defined in claim 10, wherein the means for preventing the side of said housing from contacting said fuel vent line is foam padding.

12. The apparatus defined in claim 11, wherein the means for preventing the corner of said housing from contacting said fuel vent line is a rubber cushion.

* * * * *